(12) United States Patent
Waitkus et al.

(10) Patent No.: US 9,416,729 B2
(45) Date of Patent: Aug. 16, 2016

(54) OIL TANK MOUNT WITH YOKE

(71) Applicant: UNITED TECHNOLOGIES CORPORATION, Hartford, CT (US)

(72) Inventors: Christopher Waitkus, Henderson, NV (US); Nicholas Leonard, New York, NY (US); Sohail Ahmed, Carmel, IN (US)

(73) Assignee: United Technologies Corporation, Hartford, CT (US)

( * ) Notice: Subject to any disclaimer, the term of this patent is extended or adjusted under 35 U.S.C. 154(b) by 308 days.

(21) Appl. No.: 14/208,649

(22) Filed: Mar. 13, 2014

(65) Prior Publication Data

US 2014/0360152 A1    Dec. 11, 2014

Related U.S. Application Data

(60) Provisional application No. 61/803,889, filed on Mar. 21, 2013.

(51) Int. Cl.
*F02C 7/06*     (2006.01)
*F02C 7/32*     (2006.01)

(52) U.S. Cl.
CPC .... *F02C 7/06* (2013.01); *F02C 7/32* (2013.01)

(58) Field of Classification Search
CPC .............. F02C 7/06; F02C 7/32; F01D 25/20; F01M 2001/0284; F01M 2001/1071; B61G 7/02; B60T 17/045
See application file for complete search history.

(56) References Cited

U.S. PATENT DOCUMENTS

| | | | |
|---|---|---|---|
| 5,076,703 A | 12/1991 | Loefke et al. | |
| 6,186,550 B1 | 2/2001 | Horii et al. | |
| 6,267,147 B1 | 7/2001 | Rago | |
| 6,763,814 B2 | 7/2004 | Gokan | |
| 7,004,232 B1 | 2/2006 | Nishijima | |
| 7,225,912 B1 | 6/2007 | Toennisson et al. | |
| 7,930,953 B2 | 4/2011 | Frost | |
| 7,966,965 B2 | 6/2011 | Pisseloup | |
| 8,256,458 B2 | 9/2012 | Angst | |
| 2002/0073507 A1* | 6/2002 | Presley | E05D 3/145 16/333 |
| 2013/0042630 A1* | 2/2013 | Muldoon | F02C 7/32 60/796 |

* cited by examiner

*Primary Examiner* — Arun Goyal
(74) *Attorney, Agent, or Firm* — Carlson, Gaskey & Olds, PC

(57) ABSTRACT

An engine has an oil tank mounted to an engine wall with clevis ears formed on both the oil tank and a mount bracket. A link connects the mount bracket clevis ears to the oil tank clevis ears. The link has a spherical bearing which is mounted in the oil tank clevis ears. This provides a connection allowing movement between the link and the oil tank clevis ears. The link is a yoke having arms positioned outwardly of the mount bracket clevis ears securing the oil tank to the mount bracket.

1 Claim, 4 Drawing Sheets

OIL TANK MOUNT WITH YOKE

CROSS-REFERENCE TO RELATED APPLICATION

This application claims priority to U.S. Provisional Application No. 61/803,889, filed Mar. 21, 2013.

STATEMENT REGARDING FEDERALLY SPONSORED RESEARCH OR DEVELOPMENT

This invention was made with government support under Contract No. N0001902-C-3003, awarded by the United States Navy. The Government has certain rights in this invention.

BACKGROUND OF THE INVENTION

This application relates to a mount between an oil tank and an engine wall for a gas turbine engine, wherein relative movement is allowed between the tank and the housing.

Gas turbine engines are known, and typically include a fan delivering air into a compressor. The air is compressed and delivered into a combustion section where it is mixed with fuel and ignited. Products of this combustion pass downstream over turbine rotors, driving them to rotate.

Any number of accessories are associated with a gas turbine engine. One accessory is a starter and generator. A starter begins rotation of a shaft within the gas turbine engine at start-up. A generator is driven by rotation of the gas turbine engine, and serves to generate electricity, such as may be utilized on an associated aircraft.

The accessories require lubrication. One lubrication system includes a lubricant pump and a lubricant tank for delivering oil to the engine starter and generator. In one known mount arrangement, the oil tank is mounted to an outer engine wall. Since the tank and the outer engine wall will see different stresses and have different thermal expansion coefficients, the tank is not fixed on the outer housing. Rather, a mount has been utilized that allows relative movement.

One such mount utilizes a spherical bearing connecting a first mount lever to a link, and the link is mounted within a bracket on the tank, also through a spherical bearing. Thus, there is a link having a spherical mount between a mount bracket and a bracket on the tank. This allows freedom of movement in every direction. However, this arrangement has sometimes resulted in undesirable wear.

SUMMARY OF THE INVENTION

In a featured embodiment, an engine has an oil tank mounted to an engine wall with clevis ears formed on both the oil tank and a mount bracket secured to the wall. A link connects the mount bracket clevis ears to the oil tank clevis ears. The link has a spherical bearing mounted in the oil tank clevis ears, and provides a connection allowing movement between the link and the oil tank clevis ears. The link is a yoke having arms positioned outwardly of the mount bracket clevis ears, and securing the oil tank to the mount bracket.

In another embodiment according to the previous embodiment, the arms have bushings extending through an opening in each mount bracket clevis ear. There are corresponding openings in the bushings. There is a securement member extending through the bushings. The openings in the mount bracket clevis ears secure the yoke to the mount bracket, while still allowing pivoting movement about an axis of the securement member.

In another embodiment according to any of the previous embodiments, the spherical bearing is mounted in a central extension of the yoke.

These and other features may be best understood from the following specification and drawings, the following which is a brief description.

DETAILED DESCRIPTION

Figure 1:
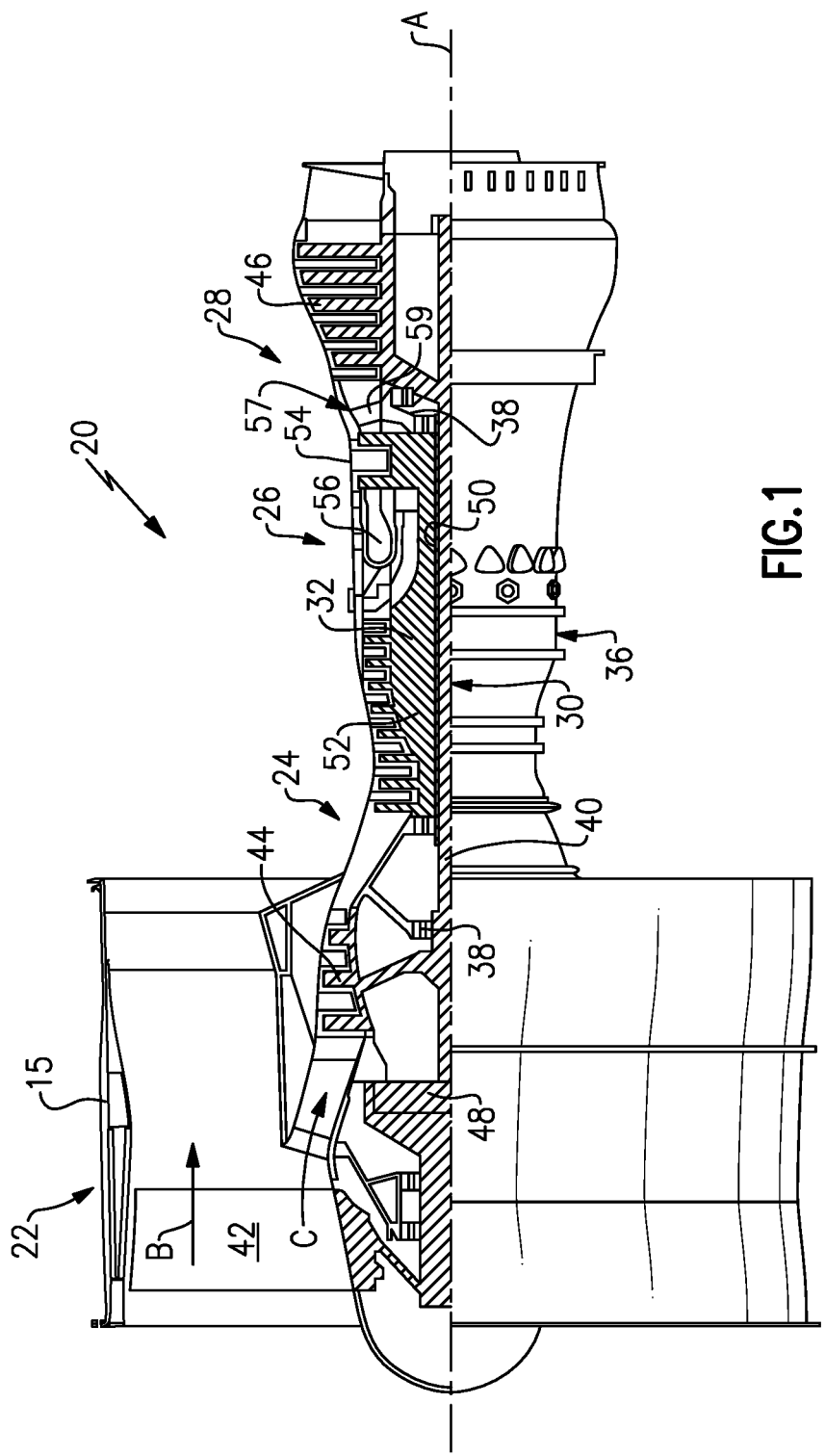
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20, in one example, is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram} \,^\circ R)/(518.7\,^\circ R)]^{0.5}$. The "Low corrected fan tip speed" as disclosed herein according to one non-limiting embodiment is less than about 1150 ft/second.

Figure 2A:
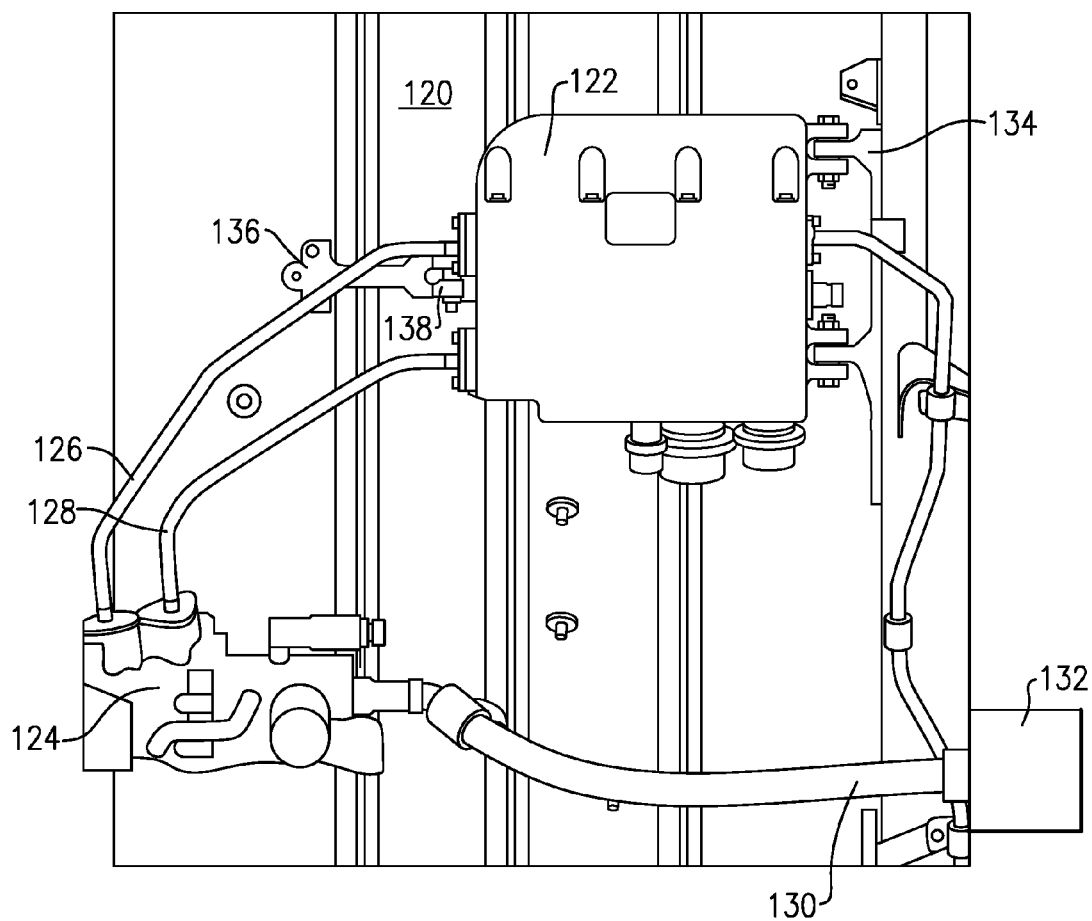
FIG. 2A shows a lubricant system.

FIG. 2A shows an engine wall 120 mounting an oil tank 122. Engine wall 120 may be part of the engine of FIG. 1. The oil tank 122 has a mount bracket 136, and a forward mount bracket 134. The rear mount bracket 136 is connected to oil tank clevis ears 138 in a manner to be described below. A lubricant pump 124 receives oil from a supply line 126, and can return lubricant to the oil tank 122 through a return line 128.

In one embodiment, an outlet line 130 from the lubricant pump 124 leads to a system 132 that will use the oil. The system 132 may be an engine starter generator for a gas turbine engine, such as the gas turbine engine illustrated in FIG. 1.

Figure 2B:
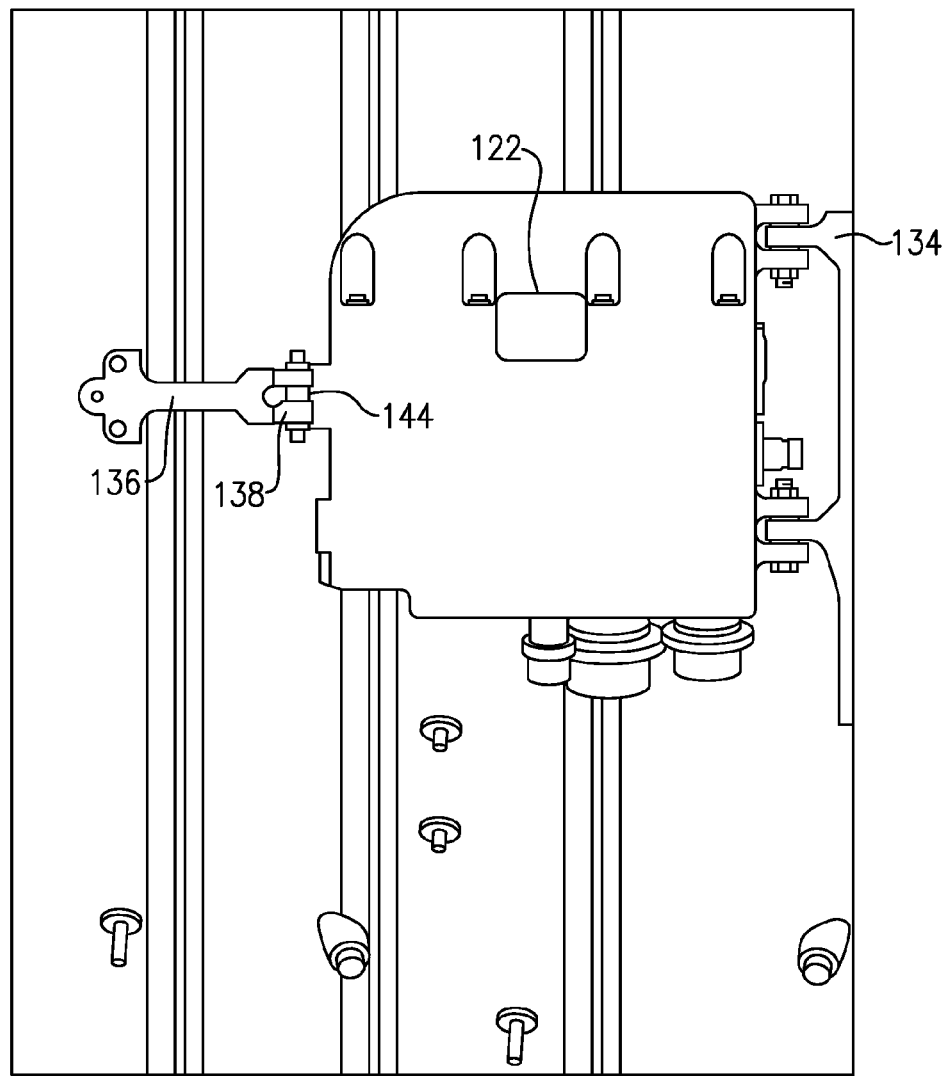
FIG. 2B shows the mounting of a tank in the lubricant system.

FIG. 2B shows details of the mount brackets 134/136 for the oil tank 122. A link 144 connects mount bracket 136 to oil tank clevis ears 138.

Figure 3:
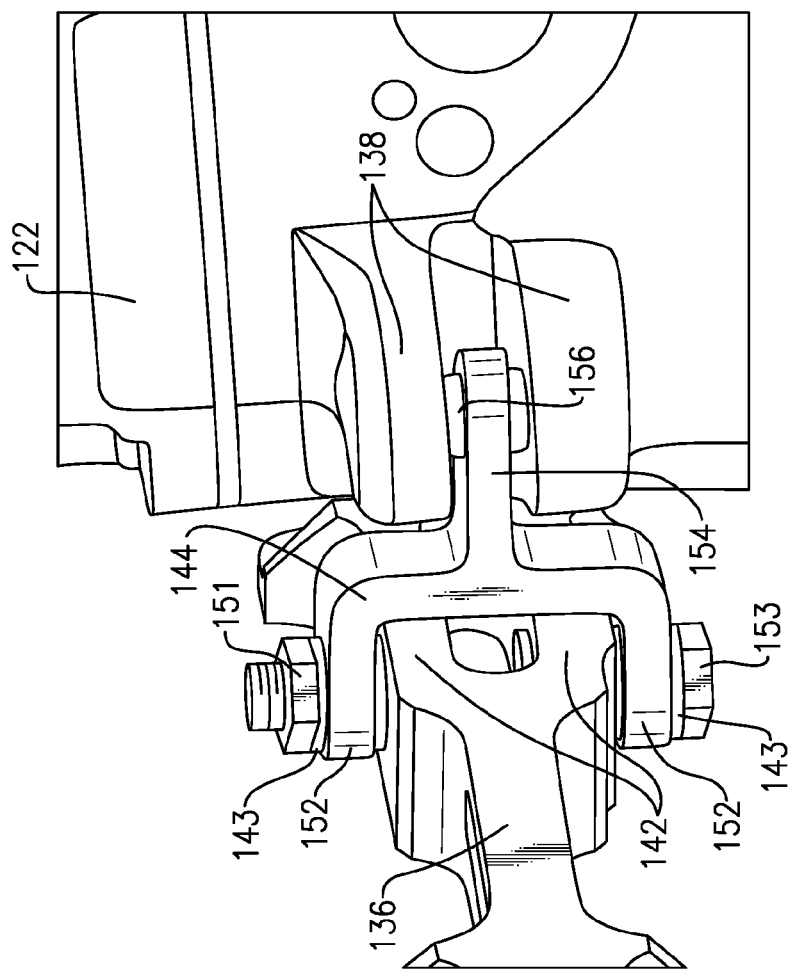
FIG. 3 shows a detail of the mount.

FIG. 3 shows details of the rear mount bracket 136 and link 144. As shown, mount bracket clevis ears 142 on rear mount bracket 136 receive link 144 connecting the mount bracket 136 to the oil tank clevis ears 138. The link 144 includes a spherical ball or spherical bearing 156 which provides a universal mount within openings in the oil tank clevis ears 138. As mentioned above, this type of connection has sometimes resulted in undue wear. Applicant has discovered the undue wear is due to an undesirably large amount of movement.

As shown in FIG. 3, the link 144 is a yoke having two arms 152 positioned outwardly of the mount bracket clevis ears 142 on the mount bracket 136. Bushings 143 are positioned within arms 152. A bolt 153 extends to a nut 151 to secure the link 144 to the forward mount bracket 136. While a bolt 153 and nut 151 are shown, other securement members may be used.

Figure 4:
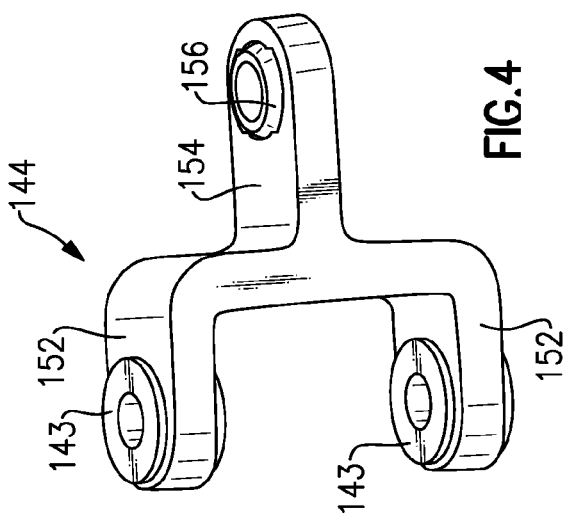
FIG. 4 shows a yoke.

FIG. 4 shows the spherical bearing 156, bushings 143, and yoke arms 152 in yoke or link 144. The spherical bearing is positioned in a central extension 154 of link 144.

An oil tank 122 is mounted to an engine wall 120. Tank clevis ears 138 and 142 are formed on both the oil tank 138 and a mount bracket 136/142 secured to the engine wall 120. A link 144 connects the mount bracket clevis ears 142 to the oil tank clevis ears 138. The link 144 is provided with a spherical bearing 156 providing a connection allowing movement between the link 144 and the oil tank clevis ears 138, and mounted in the oil tank clevis ears. The link 144 is a yoke having arms 152 positioned outwardly of the mount bracket clevis ears 142, and securing the oil tank 122 to the mount bracket 136.

The arms 152 have bushings 143 extending through an aperture in each mount bracket clevis ear 142. There are corresponding openings in each of the bushings 143. A securement member, which may be a bolt 153, extends through the bushings 143 to secure the link 144 to the mount bracket 136, while still allowing pivoting movement about an axis of the bolt 153.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An engine comprising:
    an oil tank mounted to an engine wall, with oil tank clevis ears formed on said oil tank and mount bracket clevis ears formed on a mount bracket secured to said wall, and a link connecting said mount bracket clevis ears to said oil tank clevis ears, said link having a spherical bearing mounted in said oil tank clevis ears, and providing a connection allowing movement between said link and said oil tank clevis ears;
    said link being a yoke, with said yoke having arms positioned outwardly of said mount bracket clevis ears, and securing said oil tank to said mount bracket;
    wherein said arms have bushings extending through an opening in each one of said arms, there being openings in said mount bracket clevis ears and corresponding openings in the bushings, and there being a securement member extending through the openings in the bushings and the openings in the mount bracket cievis ears to secure the yoke to the mount bracket, while still allowing pivoting movement of said arms of the yoke about an axis of said arms securement member; and
    wherein said spherical bearing is mounted in a central extension of said yoke.

* * * * *